(12) United States Patent
Toida et al.

(10) Patent No.: US 6,433,122 B1
(45) Date of Patent: Aug. 13, 2002

(54) METHOD FOR PRODUCING ORGANOPOLYSILOXANE

(75) Inventors: Shuzo Toida; Yohkichi Yamamoto; Naoji Kawamura, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/716,163

(22) Filed: Nov. 17, 2000

(30) Foreign Application Priority Data

Nov. 25, 1999 (JP) ............................ 11-334416

(51) Int. Cl.⁷ .......................... C08G 77/06; B01J 29/04
(52) U.S. Cl. ............................ 528/16; 528/12; 528/18; 528/31; 502/60; 502/66; 524/450; 524/493; 524/588
(58) Field of Search .................. 528/12, 16, 18, 528/31; 502/60, 66; 524/450, 493, 588

(56) References Cited

U.S. PATENT DOCUMENTS

| | | | |
|---|---|---|---|
| 3,853,934 A | 12/1974 | Siciliano et al. | 260/448 |
| 4,599,437 A | 7/1986 | Riederer | 556/462 |
| 5,276,173 A | 1/1994 | Marko et al. | 556/459 |
| 5,621,061 A | 4/1997 | Hager et al. | 528/21 |
| 5,977,243 A | * 11/1999 | Barthel et al. | 524/588 |
| 6,214,758 B1 | * 4/2001 | Wu et al. | 502/64 |

FOREIGN PATENT DOCUMENTS

| | | | |
|---|---|---|---|
| EP | 0146148 A1 | * 6/1985 | C07F/7/12 |
| JP | 56-26248 | 6/1981 | C08G/77/08 |
| JP | 63-14015 | 3/1988 | C08G/77/38 |
| JP | 3-221530 | 9/1991 | C08G/77/38 |
| JP | 6-200033 | 7/1994 | C08G/77/34 |
| JP | 8-319352 | 12/1996 | C08G/77/34 |
| JP | 2716680 | 11/1997 | C08L/83/04 |

* cited by examiner

*Primary Examiner*—Robert Dawson
*Assistant Examiner*—Jeffrey B. Robertson
(74) *Attorney, Agent, or Firm*—Timothy J. Troy; Patricia M. Scaduto

(57) ABSTRACT

A method for producing organopolysiloxane comprising (A) polymerizing or increasing the viscosity of straight-chain or cyclic organo(poly)siloxane using an acid-active solid catalyst, (B) adding at least one zeolite solid adsorbent, and (C) thereafter filtering off the adsorbent.

8 Claims, No Drawings

METHOD FOR PRODUCING ORGANOPOLYSILOXANE

FIELD OF THE INVENTION

This invention relates to a method for producing organopolysiloxane. More particularly, this invention relates to an organopolysiloxane production method that has the ability to inhibit the increase in viscosity or gelation that occurs with elapsed time in organopolysiloxane that has been produced by polymerizing or raising the viscosity (viscosification) of straight-chain or cyclic organo(poly)siloxane using an acid-active solid catalyst.

BACKGROUND OF THE INVENTION

The production of organopolysiloxane by the polymerization or viscosification of straight-chain or cyclic organo(poly)siloxane using acid-active solid catalyst is a well-known method (Japanese Published (Kokoku or Examined) Patent Application Numbers Sho 56-26248 (26,248/1981) and Sho 63-14015 (14,015/1988)). Viscosification of the organopolysiloxane product can be stopped by filtering off the acid-active solid catalyst.

However, the present inventors noted that this organopolysiloxane product still eventually underwent viscosification or gelation with elapsed time. It was noted in particular that a substantial timewise viscosification or gelation occurred in the case of organopolysiloxane produced by the viscosification of SiH-functional organo(poly)siloxane using an acid-active solid catalyst.

The inventors achieved this invention as a consequence of extensive investigations directed to solving the problem described above. More specifically, the object of this invention is to provide an organopolysiloxane production method that has the ability to inhibit the viscosification or gelation that occurs with elapsed time in organopolysiloxane that has been produced by the polymerization or viscosification of straight-chain or cyclic organo(poly)siloxane using an acid-active solid catalyst.

SUMMARY OF THE INVENTION

The present invention is a method for producing organopolysiloxane comprising adding at least one zeolite solid adsorbent to organopolysiloxane that has been produced by polymerizing or increasing the viscosity of straight-chain or cyclic organo(poly)siloxane using an acid-active solid catalyst, and thereafter filtering off the adsorbent.

DESCRIPTION OF THE INVENTION

A method for producing organopolysiloxane comprising (A) polymerizing or increasing the viscosity of straight-chain or cyclic organo(poly)siloxane using an acid-active solid catalyst, (B) adding at least one zeolite solid adsorbent, and (C) thereafter filtering off the adsorbent.

The present method now will be described in detail in the following. Organopolysiloxane is produced in the present method by the viscosification or polymerization of straight-chain or cyclic organo(poly)siloxane using acid-active solid catalyst. The straight-chain and cyclic organo(poly)siloxane can be exemplified by dimethylsiloxane oligomers such as silanol-endblocked dimethylsiloxane oligomers and trimethylsiloxy-endblocked dimethylsiloxane oligomers and by the straight-chain organosiloxane oligomers afforded by replacing a portion of the methyl in the preceding dimethylsiloxane oligomers with the hydrogen atom or with an alkyl group, alkenyl group, aryl group, or halogenated alkyl group. The alkyl groups are exemplified by ethyl, propyl, tert-butyl, 2-ethylhexyl, dodecyl, and octadecyl; the alkenyl groups are exemplified by vinyl, allyl, and hexenyl; the aryl groups are exemplified by phenyl and naphthyl; and the halogenated alkyl groups are exemplified by chloromethyl, 3,3,3-trifluoropropyl, 3,3,4,4,5,5,5-heptafluoropentyl, and difluoromonochloropropyl. The straight-chain and cyclic organo(poly)siloxane can be further exemplified by dimethylpolysiloxanes such as silanol-endblocked dimethylpolysiloxanes and trimethylsiloxy-endblocked dimethylpolysiloxanes and by the straight-chain organopolysiloxanes afforded by replacing a portion of the methyl in the preceding dimethylpolysiloxanes with an atom or group as already described above. The straight-chain and cyclic organo(poly)siloxane can also be exemplified by dimethylcyclosiloxane oligomers such as octamethylcyclotetrasiloxane and decamethylcyclopentasiloxane and the cyclic organosiloxane oligomers afforded by replacing a portion of the methyl in these dimethylcyclosiloxane oligomers with an atom or group as already described above. The present method in particular has the highly desirable ability to substantially inhibit the timewise viscosification or gelation that occurs after the polymerization or viscosification of SiH-functional organo(poly)siloxane.

The acid-active solid catalysts are exemplified by K-500 from Nippon Kassei Hakudo Co., Ltd., Tonsil AC from the Tonsil Co. and Filtrol Ultra from the Filtrol Corporation, which are acid-activated clays. Other examples of this type of catalyst are acid-active aluminosilicates and acid-active activated carbons.

The above-described organo(poly)siloxane can be viscosified or polymerized in the present method by stirring the above-described straight-chain or cyclic organo(poly)siloxane with the acid-active solid catalyst generally for 4 to 24 hours while heating to 60 to 100° C.

A characteristic feature of the present method is the addition of a zeolite solid adsorbent to the organopolysiloxane product. This addition may be carried out after the acid-active solid catalyst has been filtered from the organopolysiloxane product, or the zeolite solid adsorbent can be added to the mixture of acid-active solid catalyst and organopolysiloxane product. It is this zeolite solid adsorbent that functions to inhibit viscosification or gelation of the organopolysiloxane with elapsed time. The zeolite solid adsorbent can be used, for example, in pellet, bead, mesh, or powder form. The natural zeolites and synthetic zeolites are examples of usable zeolite solid adsorbents. The zeolite solid adsorbent preferably has an average pore size from 0.1 to 20 nm and more preferably from 0.1 to 10 nm. It also preferably has a porosity from 30 to 70% and more preferably from 40 to 70%.

The zeolite solid adsorbent is added in the present method preferably at from 0.5 to 30 weight parts and more preferably at from 1 to 20 weight parts, in each case per 100 weight parts organopolysiloxane. Addition of the zeolite solid adsorbent at below the lower limit runs the risk of failing to obtain an adequate inhibition of the timewise viscosification or gelation of the organopolysiloxane product. No significant additional effect can be obtained at an addition above the upper limit of the given range.

The present method also requires that the zeolite solid adsorbent be filtered from the organopolysiloxane product. Low-volatility components may also be distilled from the organopolysiloxane product as necessary or desired. The organopolysiloxane prepared by the present method is characterized by the fact that it does not undergo viscosification or gelation during storage. This organopolysiloxane is useful as a crosslinker in hydrosilylation-curing organopolysiloxane compositions and particularly as a crosslinker for hydrosilylation-curing organopolysiloxane compositions intended for the formation of cured release coatings.

EXAMPLES

The present method will be explained in greater detail through the following working examples. The organopolysiloxane viscosity values reported in the examples were measured at 25° C. using a Vismetron model VA rotational viscometer. The viscosity values were measured using rotor no. 1 at 12 rpm.

Example 1

140 kg Of trimethylsiloxy-endblocked methylhydrogenpolysiloxane (viscosity=20 mPa·s) and 4 kg acid-active solid catalyst (K-500 from Nippon Kassei Hakudo Co., Ltd.) were charged to a 200-L reaction kettle, mixed to homogeneity while bubbling nitrogen therethrough, and then stirred for 19.5 hours at 80 to 90° C. After cooling, 9.8 kg zeolite solid adsorbent (pellets, average particle diameter=1.6 mm, average pore diameter=0.4 nm, having a porosity of 52%) were added and stirring was carried out for 2 hours, after which period filtration was carried out using a filter press. The viscosity of the organopolysiloxane product was measured immediately after filtration and after holding for 5 months at room temperature. The results of these measurements are reported in Table 1.

Example 2

140 kg Of trimethylsiloxy-endblocked methylhydrogenpolysiloxane (viscosity=20 mPa·s) and 4 kg acid-active solid catalyst (K-500 from Nippon Kassei Hakudo Co., Ltd.) were charged to a 200-L reaction kettle, mixed to homogeneity while bubbling nitrogen therethrough, and then stirred for 19.5 hours at 80 to 90° C. After cooling, 9.8 kg zeolite solid adsorbent (pellets, average particle diameter=3 mm, average pore diameter=0.4 nm, having a porosity of 51%) were added and stirring was carried out for 2 hours, after which period filtration was carried out using a filter press. The viscosity of the organopolysiloxane product was measured immediately after filtration and after holding for 5 months at room temperature. The results of these measurements are reported in Table 1.

Example 3

112 kg Of trimethylsiloxy-endblocked methylhydrogenpolysiloxane (viscosity=20 mPa·s) and 3 kg acid-active solid catalyst (K-500 from Nippon Kassei Hakudo Co., Ltd.) were charged to a 200-L reaction kettle, mixed to homogeneity while bubbling nitrogen therethrough, and then stirred for 7 hours at 78 to 80° C. After cooling, 3 kg zeolite solid adsorbent (powder, average particle diameter=10 μm, average pore diameter=1 nm, having a porosity of 45%) were added and stirring was carried out for 2 hours, after which period filtration was carried out using a filter press. The viscosity of the organopolysiloxane product was measured immediately after filtration and after holding for 5 months at room temperature. The results of these measurements are reported in Table 1.

Comparative Example 1

140 kg Of trimethylsiloxy-endblocked methylhydrogenpolysiloxane (viscosity=20 mPa·s) and 4 kg acid-active solid catalyst (K-500 from Nippon Kassei Hakudo Co., Ltd.) were charged to a 200-L reaction kettle, mixed to homogeneity while bubbling nitrogen therethrough, and then stirred for 19.5 hours at 80 to 90° C. After cooling, filtration was carried out using a filter press. The viscosity of the organopolysiloxane product was measured immediately after filtration and after holding for 5 months at room temperature. The results of these measurements are reported in Table 1.

Comparative Example 2

110 kg Of trimethylsiloxy-endblocked methylhydrogenpolysiloxane (viscosity=20 mPa·s) and 3 kg acid-active solid catalyst (K-500 from Nippon Kassei Hakudo Co., Ltd.) were charged to a 200-L reaction kettle, mixed to homogeneity while bubbling nitrogen therethrough, and then stirred for 7 hours at 80 to 90° C. After cooling, 8 kg calcium carbonate micropowder were added and stirring was carried out for 2 hours, after which period filtration was carried out using a filter press. The viscosity of the organopolysiloxane product was measured immediately after filtration and after holding for 5 months at room temperature. The results of these measurements are reported in Table 1.

Comparative Example 3

140 kg Of trimethylsiloxy-endblocked methylhydrogenpolysiloxane (viscosity=20 mPa·s) and 4 kg acid-active solid catalyst (K-500 from Nippon Kassei Hakudo Co., Ltd.) were charged to a 200-L reaction kettle, mixed to homogeneity while bubbling nitrogen therethrough, and then stirred for 19.5 hours at 80 to 90° C. After cooling, 5 kg diatomaceous earth (Radiolite 900 from Showa Denko Kabushiki Kaisha) were added and stirring was carried out for 2 hours, after which period filtration was carried out using a filter press. The viscosity of the organopolysiloxane product was measured immediately after filtration and after holding for 5 months at room temperature. The results of these measurements are reported in Table 1.

TABLE 1

|  | Example 1 | Example 2 | Example 3 | Comp. Ex. 1 | Comp. Ex. 2 | Comp. Ex. 3 |
| --- | --- | --- | --- | --- | --- | --- |
| viscosity (mPa · s) | | | | | | |
| immediately after filtration | 146 | 151 | 149 | 146 | 165 | 194 |
| after holding at room temperature | 169 | 160 | 157 | 1120 | 2270 | gelled |

We claim:

1. A method for producing organopolysiloxane comprising (A) polymerizing or increasing the viscosity of straight-chain or cyclic organo(poly)siloxane using an acid-active solid catalyst, (B) then adding at least one zeolite solid adsorbent, and (C) thereafter filtering off the adsorbent.

2. The method of claim 1 for producing organopolysiloxane, where the straight-chain or cyclic organo(poly)siloxane is organo(poly)siloxane that contains silicon-bonded hydrogen.

3. The method of claim 1 for producing organopolysiloxane, where the average pore diameter of the zeolite solid adsorbent is from 0.1 to 20 nm.

4. The method of claim 1 for producing organopolysiloxane, where the average pore diameter of the zeolite solid adsorbent is from 0.1 to 10 nm.

5. The method of claim 1 for producing organopolysiloxane, where the zeolite solid adsorbent has a porosity of 30 to 70%.

6. The method of claim 1 for producing organopolysiloxane, where the zeolite solid adsorbent has a porosity of 40 to 70%.

7. The method of claim 1 for producing organopolysiloxane, where the zeolite solid adsorbent is added at from 0.5 to 30 weight parts per 100 weight parts of the organopolysiloxane.

8. The method of claim 1 for producing organopolysiloxane, where the zeolite solid adsorbent is added at from 1 to 20 weight parts per 100 weight parts of the organopolysiloxane.

* * * * *